(12) United States Patent
Saen et al.

(10) Patent No.: US 9,966,999 B2
(45) Date of Patent: May 8, 2018

(54) WIRELESS POWER RECEIVING DEVICE HAVING A SHORT-CIRCUITING SWITCH, AND WIRELESS POWER TRANSMISSION DEVICE

(71) Applicant: TDK CORPORATION, Tokyo (JP)

(72) Inventors: Tsunehiro Saen, Tokyo (JP); Masahide Ohnishi, Tokyo (JP); Ryo Miyazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 402 days.

(21) Appl. No.: 14/315,671

(22) Filed: Jun. 26, 2014

(65) Prior Publication Data

US 2015/0001956 A1  Jan. 1, 2015

(30) Foreign Application Priority Data

Jun. 27, 2013 (JP) .................. 2013-134996
May 19, 2014 (JP) .................. 2014-103046

(51) Int. Cl.
| | |
|---|---|
| H04B 5/00 | (2006.01) |
| H02J 7/02 | (2016.01) |
| H02J 50/12 | (2016.01) |
| H02J 1/04 | (2006.01) |
| H02J 5/00 | (2016.01) |
| H02J 1/00 | (2006.01) |

(52) U.S. Cl.
CPC .............. *H04B 5/0037* (2013.01); *H02J 1/04* (2013.01); *H02J 5/005* (2013.01); *H02J 7/025* (2013.01); *H02J 50/12* (2016.02); *H04B 5/0075* (2013.01); *H02J 2001/002* (2013.01)

(58) Field of Classification Search
CPC ..... H04B 5/0037; H04B 5/0075; H02J 5/005; H02J 1/04; H02J 2001/002
USPC ............................................. 307/104
See application file for complete search history.

(56) References Cited

U.S. PATENT DOCUMENTS

| 3,875,945 A * | 4/1975 | Friedman ........... A61B 18/1206 |
| | | 606/38 |
| 4,945,291 A | 7/1990 | Masaki |
| (Continued) | | |

FOREIGN PATENT DOCUMENTS

| JP | S63-261697 A | 10/1988 |
| JP | H08-214540 A | 8/1996 |
| (Continued) | | |

*Primary Examiner* — Jared Fureman
*Assistant Examiner* — Michael Warmflash
(74) *Attorney, Agent, or Firm* — Oliff PLC

(57) ABSTRACT

To provide a wireless power receiving device, and a wireless power transmission device capable of improving the reliability of a protection circuit while preventing breakage of a circuit element upon occurrence of any abnormality, such as overvoltage or overcurrent. A wireless power receiving device includes a power receiving coil; a rectifier unit that performs full-wave rectification of the power received by the power receiving coil and supplies the power to a load; power-receiving-side detecting unit that detects an output voltage value or an output current value from the rectifier unit; and switching unit that short-circuits one of two current paths through the rectifier unit if the value detected by the power-receiving-side detecting unit exceeds a predetermined reference value.

13 Claims, 7 Drawing Sheets

(56) References Cited

U.S. PATENT DOCUMENTS

| | | | | |
|---|---|---|---|---|
| 5,293,308 A * | 3/1994 | Boys | .................. | H02J 5/005 324/392 |
| 5,991,170 A | 11/1999 | Nagai et al. | | |
| 6,037,745 A * | 3/2000 | Koike | .................. | H02J 7/0029 320/104 |
| 6,134,130 A * | 10/2000 | Connell | ............. | G06K 19/0701 363/70 |
| 7,009,860 B2 | 3/2006 | Kazutoshi | | |
| 2005/0135129 A1 | 6/2005 | Kazutoshi | | |
| 2010/0013321 A1 * | 1/2010 | Onishi | ................. | G08C 17/04 307/104 |
| 2011/0053500 A1 * | 3/2011 | Menegoli | ............. | H04B 5/0037 455/41.1 |
| 2011/0254379 A1 * | 10/2011 | Madawala | ............. | H02J 5/005 307/104 |
| 2012/0235636 A1 * | 9/2012 | Partovi | ................... | H02J 7/025 320/108 |
| 2013/0099585 A1 * | 4/2013 | Von Novak | ............. | H01F 38/14 307/104 |
| 2014/0001851 A1 * | 1/2014 | Murase | ................ | H04B 5/0037 307/36 |
| 2014/0015328 A1 * | 1/2014 | Beaver | ................. | B60L 11/182 307/104 |
| 2015/0274023 A1 * | 10/2015 | Houivet | ................... | B60L 3/04 320/108 |

FOREIGN PATENT DOCUMENTS

| | | |
|---|---|---|
| JP | A-11-27870 | 1/1999 |
| JP | 2005-147016 A | 6/2005 |
| JP | 2008-285161 A | 11/2008 |
| JP | 2011-249229 A | 12/2011 |
| WO | 98/34319 A1 | 8/1998 |

* cited by examiner

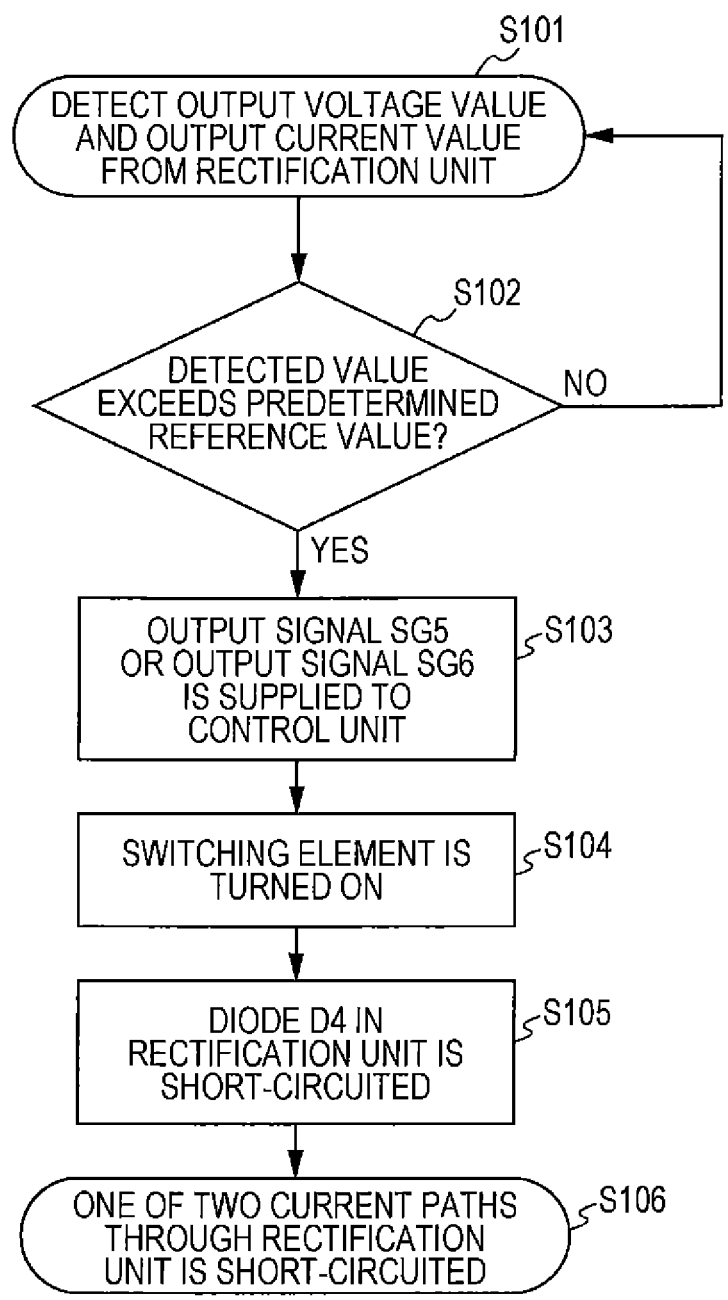

WIRELESS POWER RECEIVING DEVICE HAVING A SHORT-CIRCUITING SWITCH, AND WIRELESS POWER TRANSMISSION DEVICE

BACKGROUND OF THE INVENTION

1. Field of the Invention

The present invention relates to a wireless power receiving device and a wireless power transmission device.

2. Description of the Related Art

In recent years, attention is paid to a wireless power transmission technology to externally supply power in a wireless mode without using a power cable in electric vehicles and mobile devices.

Since an occurrence of any abnormality in transmission of high power may cause breakage of a circuit element, such as a load, in such a wireless power transmission technology, there is an increasing demand to improve the safety of the entire device to which the wireless power transmission technology is applied.

In response to such a demand, for example, Japanese Unexamined Patent Application Publication No. 11-27870 proposes a charging device including an inverter circuit, a rectifier circuit, a booster circuit, a voltage checking circuit, and a short-circuiting circuit. The inverter circuit is provided at a primary coil (power feeding coil) side of a transformer. The inverter circuit performs frequency conversion of charge power to generate charge alternating current power and applies the charge alternating current power to the primary coil. The rectifier circuit is provided at a secondary coil (power receiving coil) side of the transformer. The rectifier circuit rectifies induced voltage occurring at the secondary coil to generate charge direct current power. The booster circuit is connected between the terminals of the secondary coil and increases the induced voltage occurring at the secondary coil to apply the induced voltage to the rectifier circuit. The voltage checking circuit checks the voltage of the direct current power and outputs a drive signal upon detection of a predetermined reference voltage value. The short-circuiting circuit causes short-circuit between the terminals of the secondary coil in response to the drive signal.

In the charging device having the above configuration, the rectifier circuit is composed of a bridge circuit including four diodes. Transistors are connected in parallel to two diodes in the rectifier circuit. More specifically, a collector terminal of the transistor is connected to a cathode of the corresponding diode and an emitter terminal of the transistor is connected to an anode of the corresponding diode. The two transistors are subjected to simultaneous turning on and off control. When the direct current power voltage is increased to the reference voltage, the two transistors are turned on, the short-circuit is caused between the terminals of the secondary coil, and the boost function of a capacitor is disabled to prevent the direct current power voltage from being increased to a value higher than the reference voltage value.

However, with the technology disclosed in Japanese Unexamined Patent Application Publication No. 11-27870, since the two transistors are simultaneously turned on to cause the short-circuit between the terminals of the secondary coil, the number of circuit elements and wiring lines is increased. Accordingly, there is a problem in that the circuit is complicated and the size of the circuit is increased.

SUMMARY OF THE INVENTION

Accordingly, it is an object of the present invention to provide a wireless power receiving device and a wireless power transmission device capable of reducing the size of the device and simplifying the device while preventing a circuit element from being broken upon occurrence of any abnormality, such as overvoltage or overcurrent.

According to an embodiment of the present invention, a wireless power receiving device that wirelessly receive power includes a power receiving coil, a rectifier unit, power-receiving-side detecting means, and switching means. The rectifier unit performs full-wave rectification of the power received by the power receiving coil and supplies the power to a load. The power-receiving-side detecting means detects an output voltage value or an output current value from the rectifier unit. The switching means short-circuits one of two current paths through the rectifier unit if the value detected by the power-receiving-side detecting means exceeds a predetermined reference value.

With the above configuration, the wireless power receiving device includes the switching means, which short-circuits one of the two current paths through the rectifier unit if the value detected by the power-receiving-side detecting means exceeds the predetermined reference value. Accordingly, the current flowing along one of the current paths through the rectifier unit is increased and the current flowing along the other current path through the rectifier unit is decreased. In other words, the current supplied from the rectifier unit to the load is also decreased. The voltage applied to the load is also decreased with the decreasing current from the rectifier unit to the load. Consequently, excessive voltage or excessive current that flows through a circuit element, such as the load, is suppressed upon occurrence of any abnormality, such as the overvoltage or the overcurrent. As a result, it is possible to prevent the breakage of the circuit element upon occurrence of any abnormality, such as the overvoltage or the overcurrent. In addition, since a protection circuit that operates upon occurrence of any abnormality is composed of the switching means, which short-circuits one of the two current paths through the rectifier unit, it is possible to reduce the size of the device and simplify the device.

The rectifier unit preferably includes a bridge circuit in which four diodes are bridge-connected to each other and a smoothing capacitor connected in parallel to the bridge circuit. The switching means is preferably composed of a switching element connected in parallel to one diode, among the four diodes in the bridge circuit. With this configuration, it is possible to improve the use efficiency as a transformer.

It is preferred that no capacitor connected in series or in parallel to the power receiving coil be provided. With this configuration, it is possible to further reduce the size of the device and simplify the device.

According to an embodiment of the present invention, a wireless power transmission device includes the wireless power receiving device and a wireless power feeding device. The wireless power feeding device includes a power feeding coil; a power conversion circuit that converts direct current power that is input to alternating current power and supplies the alternating current power to the power feeding coil; power-feeding-side detecting means that detects an output current value from the power conversion circuit; and power-feeding operation controlling means that controls a power feeding operation of the wireless power feeding device. If the value detected by the power-feeding-side detecting means exceeds a predetermined reference value, the power-feeding operation controlling means performs an intermittent control action in which start and stop of the power feeding operation of the wireless power feeding device are repeated.

With this configuration, the power-feeding operation controlling means performs the intermittent control action in which start and stop of the power feeding operation of the wireless power feeding device are repeated if the value detected by the power-feeding-side detecting means exceeds the predetermined reference value. Accordingly, it is possible to prevent the breakage of a circuit element, such as the power conversion circuit, even if any abnormality occurs at the power receiving side and the overcurrent flows at the power feeding side. In addition, since the wireless power feeding device itself detects an occurrence of the overcurrent to restrict the power feeding operation in the wireless power transmission device, it is possible to minimize the time delay from the occurrence of any abnormality at the power receiving side to the start of the restriction of the power feeding operation.

The wireless power receiving device preferably further includes transmitting means that transmits a signal indicating an abnormal state to the wireless power feeding device if the value detected by the power-receiving-side detecting means exceeds the predetermined reference value. If the value detected by the power-feeding-side detecting means exceeds the predetermined reference value and the signal indicating the abnormal state is received from the transmitting means, the power-feeding operation controlling means may stop the power feeding operation of the wireless power feeding device. With the above configuration, since the power feeding operation of the wireless power feeding device is stopped upon detection of any abnormality at the power receiving side, in addition to any abnormality at the power feeding side, it is possible to prevent any problem caused by the stop of the power feeding operation from occurring when the abnormality at the power feeding side is not affected by the abnormality at the power receiving side. As a result, it is possible to improve the reliability as the wireless power transmission device.

According to the present invention, it is possible to provide a wireless power receiving device and a wireless power transmission device capable of reducing the size of the device and simplifying the device while preventing a circuit element from being broken upon occurrence of any abnormality, such as the overvoltage or the overcurrent.

BRIEF DESCRIPTION OF THE DRAWINGS

FIG. 2 is a flowchart illustrating an example of a protection operation process in the wireless power transmission device according to the first embodiment;

DESCRIPTION OF THE PREFERRED EMBODIMENTS

Figure 1:
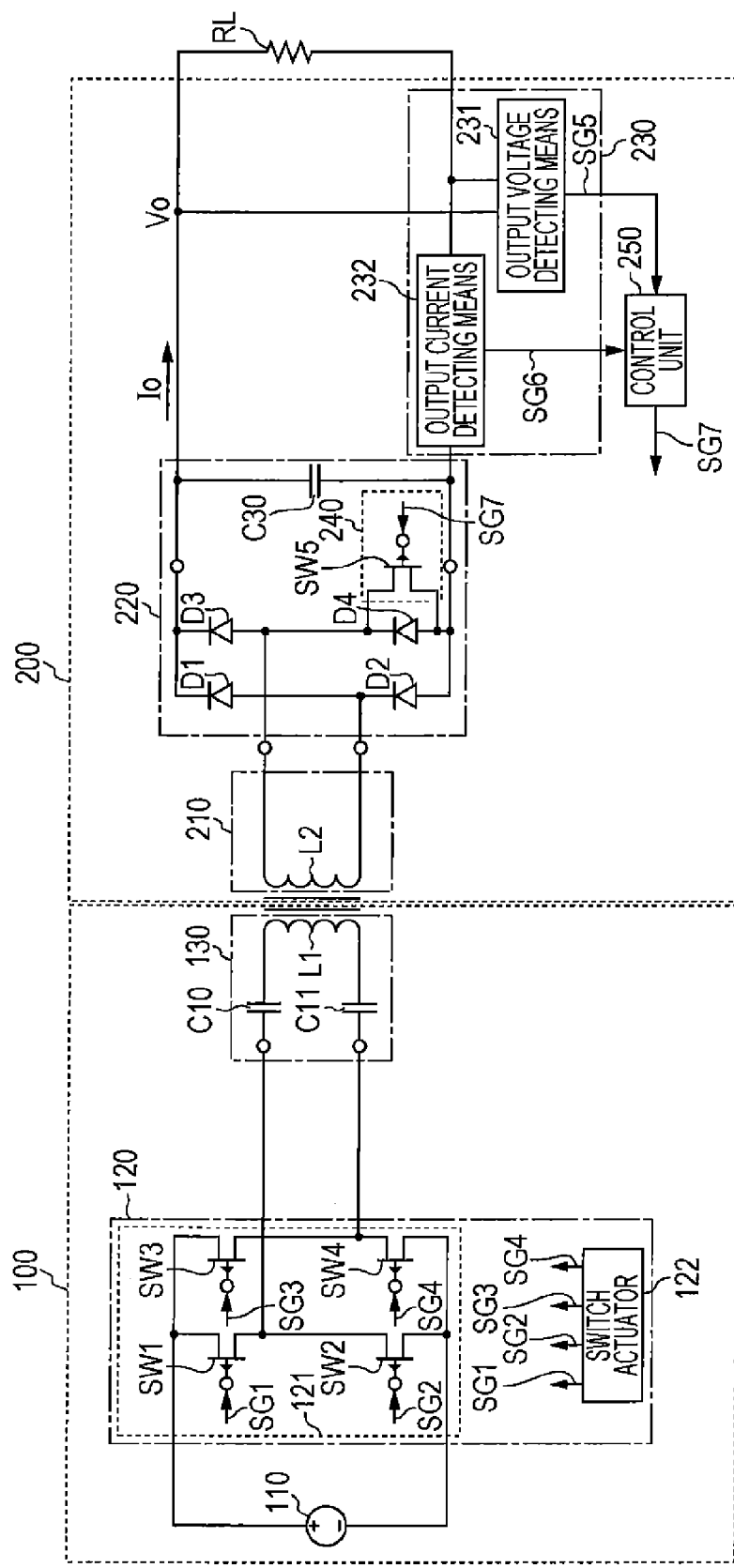
FIG. 1 is a circuit diagram illustrating an exemplary configuration of a wireless power transmission device according to a first embodiment of the present invention with a load.

Embodiments of the present invention will herein be described in detail with reference to the attached drawings. The same reference numerals are used in the following description to identify the same components or the components having the same functions. A duplicated description of such components is omitted herein.

First Embodiment

The configuration of a wireless power transmission device S1 according to a first embodiment of the present invention will now be descried with reference to FIG. 1. FIG. 1 is a circuit diagram illustrating an exemplary configuration of the wireless power transmission device S1 according to the first embodiment of the present invention with a load.

Referring to FIG. 1, the wireless power transmission device S1 includes a wireless power feeding device 100 and a wireless power receiving device 200.

The wireless power feeding device 100 includes a power source 110, a power conversion circuit 120, and a power feeding unit 130. The power source 110 supplies direct current power to the power conversion circuit 120. The power source 110 is not specifically limited as long as the direct current power is output. For example, a direct current power source that supplies power resulting from rectification and smoothing of power from a commercial alternating-current power source, a secondary battery, a direct current power source that supplies power generated by solar photovoltaic power generation, or a switching power supply device such as a switching converter may be used as the power source 110.

The power conversion circuit 120 includes a power converter 121 and a switch actuator 122. The power conversion circuit 120 has a function to convert the input direct current power supplied from the power source 110 into alternating current power. More specifically, the power converter 121 is composed of a switching circuit in which multiple switching elements are bridge-connected to each other. In the first embodiment, the power converter 121 is composed of a full-bridge-type circuit using four switching elements SW1 to SW4. For example, a metal oxide semiconductor-field effect transistor (MOS-FET) or an insulated gate bipolar transistor (IGBT) may be used as each of the switching elements SW1 to SW4. The switching elements SW1 to SW4 are subjected to turning on and off control in response to SW control signals SG1 to SG4, respectively, supplied from the switch actuator 122 to convert the input direct current power supplied from the power source 110 to the alternating current power.

The power feeding unit 130 includes a power feeding coil L1 and power-feeding-side resonant capacitors C10 and C11. The power feeding coil L1 is formed using a Litz wire formed of multiple fine conductor strands or a single line. For example, a planar coil or a solenoid coil may be used as the power feeding coil L1. The power feeding coil L1 composes a power-feeding-side LC resonant circuit with the power-feeding-side resonant capacitors C10 and C11. Although the configuration in which the power-feeding-side resonant capacitors C10 and C11 are connected in series to the power feeding coil L1 is adopted in the first embodiment, the first embodiment is not limited to this configuration. For example, a configuration in which only the power-feeding-side resonant capacitor C10 is connected in series to the power feeding coil L1, a configuration in which only the power-feeding-side resonant capacitor C10 is connected in parallel to the power feeding coil L1, or a configuration in which the power-feeding-side resonant capacitor C10 is connected in series to the power feeding coil L1 and the power-feeding-side resonant capacitor C11 is connected in parallel to the power feeding coil L1 may be adopted. When the wireless power transmission device S1 according to the first embodiment is used in equipment to supply power to a vehicle, such as an electric vehicle, the power feeding unit 130 is provided in the ground or near the ground.

The wireless power receiving device 200 includes a power receiving unit 210, a rectifier unit 220, power-receiving-side detecting means 230, switching means 240, and a control unit 250. The power feeding unit 130 in the wireless power feeding device 100 is magnetically coupled to the power receiving unit 210 in the wireless power receiving device 200. The alternating current power supplied from the power conversion circuit 120 to the power feeding unit 130 is induced to the power receiving unit 210 by an effect of near-field transmission, and electromotive force is excited. In other words, the wireless power receiving device 200 wirelessly receives the power from the wireless power feeding device 100.

The power receiving unit 210 includes a power receiving coil L2. The power receiving coil L2 is formed using a Litz wire formed of multiple fine conductor strands or a single line. For example, a planar coil or a solenoid coil may be used as the power receiving coil L2. In the first embodiment, the power receiving coil L2 includes no capacitor connected in series or in parallel to the power receiving coil L2. In other words, the power receiving coil L2 is configured so as to compose no resonant circuit with a circuit element at the power receiving side. Specifically, the power receiving side is in a substantially non-resonant state. Since it is not necessary to provide the circuit element composing the resonant circuit with the power receiving coil L2 in the first embodiment, as described above, it is possible to reduce the size of the device and simplify the device. The "substantially non-resonant state" does not mean exclusion of accidental resonance of the power receiving coil L2 with any circuit element. When the wireless power transmission device S1 according to the first embodiment is used in equipment to supply power to a vehicle, such as an electric vehicle, the power receiving unit 210 is mounted under the vehicle.

The rectifier unit 220 performs full-wave rectification of the power received by the power receiving coil L2 to supply the power to a load RL. The rectifier unit 220 includes a bridge circuit in which four diodes (rectifier elements) D1 to D4 are full-bridge connected to each other and a smoothing capacitor C30 connected in parallel to the bridge circuit in the first embodiment. Accordingly, the alternating current flowing through the rectifier unit 220 flows along two current paths: one current path that originates from the power receiving coil L2 and returns to the power receiving coil L2 through the diode D3, the smoothing capacitor C30, the load RL, and the diode D2 and the other current path that originates from the power receiving coil L2 and returns to the power receiving coil L2 through the diode D1, the smoothing capacitor C30, the load RL, and the diode D4. In other words, the rectifier unit 220 has a function to perform the full-wave rectification of the alternating current power supplied from the power receiving coil L2. The smoothing capacitor C30 smoothes the rectified voltage to generate direct current voltage. Since the rectifier unit 220 is composed of the bridge circuit in which the four diodes D1 to D4 are full-bridge connected to each other and the smoothing capacitor C30 connected in parallel to the bridge circuit in the above manner, it is possible to improve the use efficiency as a transformer.

The power-receiving-side detecting means 230 includes output voltage detecting means 231 and output current detecting means 232. The output voltage detecting means 231 detects an output voltage value from the rectifier unit 220. Reading of the voltage value detected by the output voltage detecting means 231 allows the supply of the power from the rectifier unit 220 to the load RL to be confirmed. The output voltage detecting means 231 compares a predetermined reference voltage value with the detected voltage value and, if the detected voltage value exceeds the reference voltage value, supplies an output signal SG5 to the control unit 250 described below. For example, a voltage divider circuit or a voltage detection transformer may be used as the output voltage detecting means 231. The output current detecting means 232 detects an output current value from the rectifier unit 220. The output current detecting means 232 compares a predetermined reference current value with the detected current value and, if the detected current value exceeds the reference current value, supplies an output signal SG6 to the control unit 250 described below. A current sensor or a current transformer may be used as the output current detecting means 232.

The switching means 240 has a function to short-circuit one of the two current paths through the rectifier unit 220. In the first embodiment, the switching means 240 is composed of a switching element SW5, such as a field effect transistor (FET), and is connected in parallel to the diode D4 in the rectifier unit 220. More specifically, a collector terminal of the switching element SW5 is connected to a cathode of the diode D4 and an emitter terminal of the switching element SW5 is connected to an anode of the diode D4. In other words, the switching means 240 is connected in parallel only to one diode D4, among the four diodes D1 to D4 in the bridge circuit in the rectifier unit 220. The switching element SW5 has a function to be turned on or off in response to a drive signal SG7 supplied from the control unit 250 described below. Specifically, when the switching element SW5 is turned on, the diode D4 is short-circuited and one of the two current paths through the rectifier unit 220 originates from the power receiving coil L2 and returns to the power receiving coil L2 through the switching element SW5 and the diode D2. In other words, one of the two current paths through the rectifier unit 220 is short-circuited. Accordingly, the rectifier unit 220 does not function as the full-wave rectifier circuit temporarily. In contrast, when the switching element SW5 is turned off, the rectifier unit 220 functions as the full-bridge-type full-wave rectifier circuit in which the four diodes D1 to D4 are full-bridge-connected to each other. Although the configuration in which the switching element SW5 is connected in parallel to the diode D4 is adopted in the first embodiment, the first embodiment is not limited to this configuration. A configuration in which the switching element SW5 is connected in parallel to the diode D2 may be adopted.

The control unit 250 controls the operation of the switching means 240. Specifically, upon reception of the output signal SG5 from the output voltage detecting means 231, the control unit 250 performs control so that the drive signal SG7 is supplied to the switching element SW5 to turn on the switching element SW5. Upon reception of the output signal SG6 from the output current detecting means 232, the control unit 250 performs control so that the drive signal SG7 is supplied to the switching element SW5 to turn on the switching element SW5.

A protection operation upon occurrence of any abnormality in the wireless power transmission device S1 according to the first embodiment will now be described in detail with reference to a flowchart in FIG. 2. FIG. 2 is a flowchart illustrating an example of the protection operation process in the wireless power transmission device according to the first embodiment of the present invention.

Referring to FIG. 2, upon start of wireless transmission of the power from the wireless power feeding device 100 to the wireless power receiving device 200 in the wireless power transmission device S1, in Step S101, the power-receiving-side detecting means 230 constantly detects the output voltage value and the output current value from the rectifier unit 220. Specifically, the output voltage value from the rectifier unit 220 is detected by the output voltage detecting means 231 and the output current value from the rectifier unit 220 is detected by the output current detecting means 232.

In Step S102, the output voltage detecting means 231 compares the output voltage value detected in Step S101 with the predetermined reference voltage value. The output current detecting means 232 compares the output current value detected in Step S101 with the predetermined reference current value. The predetermined reference voltage value in the output voltage detecting means 231 is arbitrarily set within an allowable range of the output voltage value in which breakage of a circuit element, such as the load, is prevented. Similarly, the predetermined reference current value in the output current detecting means 232 is arbitrarily set within an allowable range of the output current value in which breakage of a circuit element, such as the load, is prevented.

If the comparison between the output voltage value detected in Step S101 and the predetermined reference voltage value indicates that the output voltage value detected in Step S101 exceeds the predetermined reference voltage value (YES in Step S102), in Step S103, the output signal SG5 is supplied from the output voltage detecting means 231 to the control unit 250. Similarly, if the comparison between the output current value detected in Step S101 and the predetermined reference current value indicates that the output current value detected in Step S101 exceeds the predetermined reference current value (YES in Step S102), in Step S103, the output signal SG6 is supplied from the output current detecting means 232 to the control unit 250.

If the comparison between the output voltage value detected in Step S101 and the predetermined reference voltage value indicates that the output voltage value detected in Step S101 is lower than the predetermined reference voltage value (NO in Step S102), the process goes back to Step S101 to repeat Step S101 and Step S102. Similarly, if the comparison between the output current value detected in Step S101 and the predetermined reference current value indicates that the output current value detected in Step S101 is lower than the predetermined reference current value (NO in Step S102), the process goes back to Step S101 to repeat Step S101 and Step S102. If the output voltage value detected in Step S101 exceeds the predetermined reference voltage value or the output current value detected in Step S102, the process to goes to Step S103 to execute Step S103 and the steps subsequent to Step S103. In contrast, if the output voltage value detected in Step S101 is lower than the predetermined reference voltage value and the output current value detected in Step S101 is lower than the predetermined reference current value, the process goes back to Step S101 to repeat Step S101 and Step S102.

In Step S104, upon reception of the output signal SG5 or the output signal SG6, the control unit 250 performs the control so that the drive signal SG7 is supplied to the switching element SW5 to turn on the switching element SW5.

In Step S105, upon turning on of the switching element SW5, the diode D4 in the rectifier unit 220 is short-circuited.

In Step S106, in response to the short-circuiting of the diode D4, one of the two current paths through the rectifier unit 220 originates from the power receiving coil L2 and returns to the power receiving coil L2 through the switching element SW5 and the diode D2. Accordingly, the current flowing along the one current path through the rectifier unit 220 is increased and the current flowing along the other current path through the rectifier unit 220 is decreased to decrease the output voltage value and the output current value from the rectifier unit 220. Then, the protection operation is terminated. The protection operation suppresses excessive voltage or excessive current that flows through a circuit element, such as the load, upon occurrence of any abnormality, such as the overvoltage or the overcurrent.

Figure 3A:
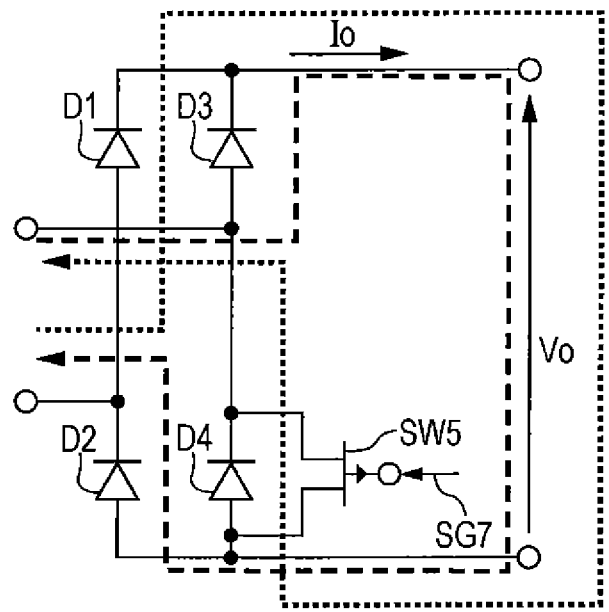
FIG. 3A is a partial enlargement diagram of an exemplary circuit configuration indicating a current path when a rectifier unit illustrated in FIG. 1 functions as a full-wave rectifier circuit.
Figure 3B:
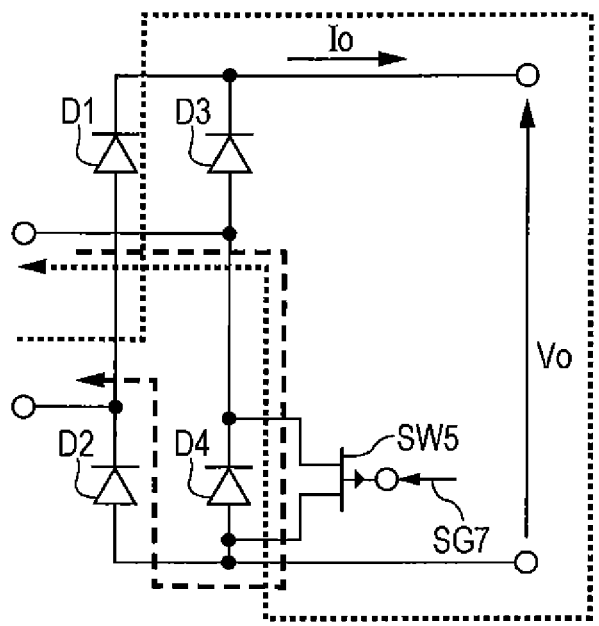
FIG. 3B is a partial enlargement diagram of an exemplary circuit configuration indicating the current path when one of the current paths through the rectifier unit illustrated in FIG. 1 is short-circuited.
Figure 4A:
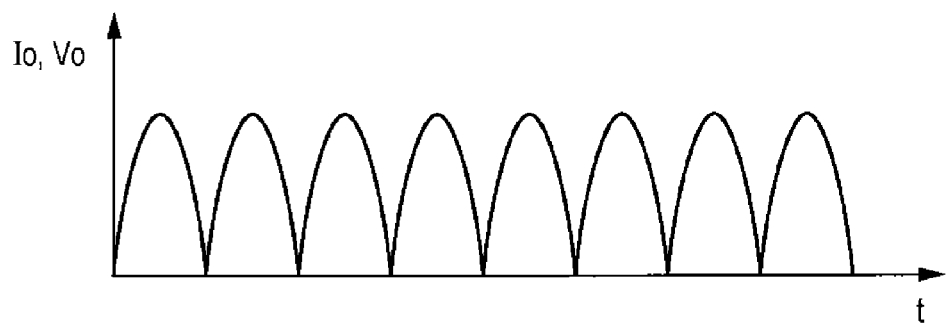
FIG. 4A illustrates an exemplary output voltage waveform and output current waveform when the rectifier unit functions as the full-wave rectifier circuit.
Figure 4B:
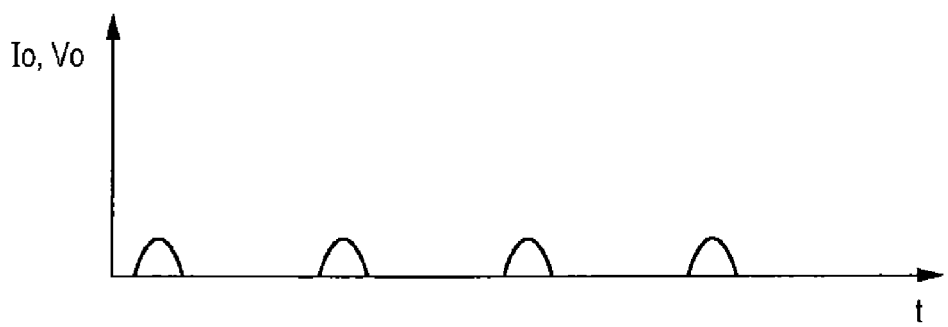
FIG. 4B illustrates an exemplary output voltage waveform and output current waveform when one of the current paths through the rectifier unit is short-circuited.

An output voltage waveform and an output current waveform from the rectifier unit 220 will now be described in detail with reference to FIGS. 3A and 3B and FIGS. 4A and 4B. FIG. 3A is a partial enlargement diagram of an exemplary circuit configuration indicating the current path when the rectifier unit illustrated in FIG. 1 functions as the full-wave rectifier circuit. FIG. 3B is a partial enlargement diagram of an exemplary circuit configuration indicating the current path when one of the current paths through the rectifier unit illustrated in FIG. 1 is short-circuited. FIG. 4A illustrates an example of the output voltage waveform and the output current waveform when the rectifier unit functions as the full-wave rectifier circuit. FIG. 4B illustrates an example of the output voltage waveform and the output current waveform when one of the current paths through the rectifier unit is short-circuited.

The case in which the rectifier unit 220 functions as the full-wave rectifier circuit will now be described. As illustrated in FIG. 3A, one of the current paths of the alternating current flowing through the rectifier unit 220 originates from the power receiving coil L2 and returns to the power receiving coil L2 through the diode D3, the smoothing capacitor C30, the load RL, and the diode D2 because the switching element SW5 is turned off, and the other current path originates from the power receiving coil L2 and returns to the power receiving coil L2 through the diode D1, the smoothing capacitor C30, the load RL, and the diode D4. Here, an output voltage waveform Vo and an output current waveform Io from the rectifier unit 220 are waveforms in which a negative half period of an alternating current sine wave is output, in addition to a positive half period of the alternating current sine wave, as illustrated in FIG. 4A.

The case in which one of the current paths through the rectifier unit 220 is short-circuited will now be described. As illustrated in FIG. 3B, one of the current paths of the alternating current flowing through the rectifier unit 220 originates from the power receiving coil L2 and returns to the power receiving coil L2 through the switching element SW5 and the diode D2 because the switching element SW5 is turned on, and the other current path originates from the power receiving coil L2 and returns to the power receiving coil L2 through diode D1, the smoothing capacitor C30, the load RL, and the diode D4. Here, the output voltage waveform Vo and the output current waveform Io from the rectifier unit 220 are waveforms in which only the positive half period of the alternating current sine wave is output, the amplitude of which is small, and the duty ratio of which is low, as illustrated in FIG. 4B.

As described above, the wireless power transmission device S1 according to the first embodiment includes the switching means 240, which short-circuits one of the two current paths through the rectifier unit 220 if the value detected by the power-receiving-side detecting means 230 exceeds the predetermined reference value. Accordingly, the current flowing along one of the current paths through the rectifier unit 220 is increased and the current flowing along the other current path through the rectifier unit 220 is decreased. In other words, the current supplied from the rectifier unit 220 to the load RL is also decreased. The voltage applied to the load RL is also decreased with the decreasing current from the rectifier unit 220 to the load RL. Consequently, excessive voltage or excessive current that flows through a circuit element, such as the load RL, is suppressed upon occurrence of any abnormality, such as the overvoltage or the overcurrent. As a result, it is possible to prevent the breakage of the circuit element upon occurrence of any abnormality, such as the overvoltage or the overcurrent. In addition, since a protection circuit that operates upon occurrence of any abnormality is composed of the switching means 240, which short-circuits one of the two current paths through the rectifier unit 220, it is possible to reduce the size of the device and simplify the device.

Modification of First Embodiment

Figure 5:
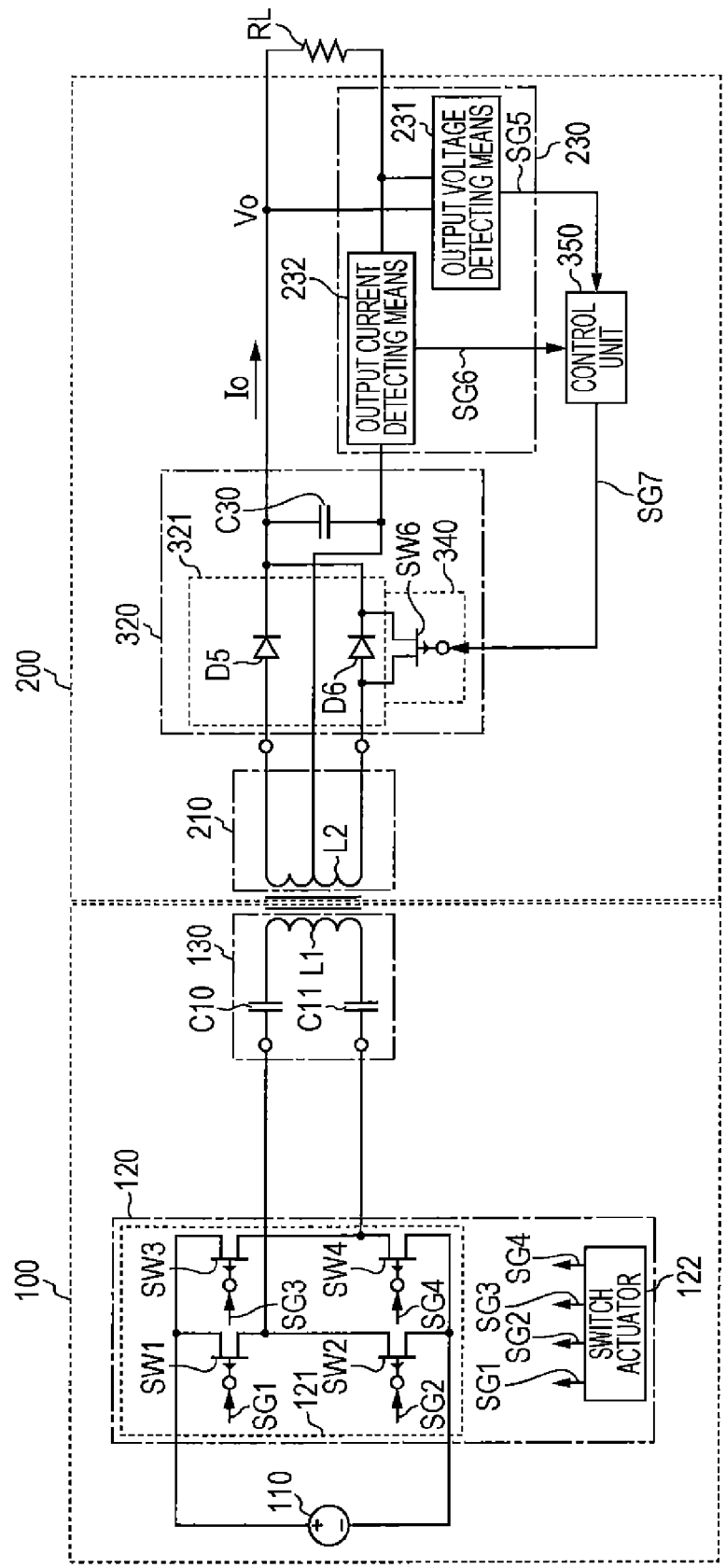
FIG. 5 is a circuit diagram illustrating an exemplary configuration of a wireless power transmission device according to a modification of the first embodiment of the present invention with the load.

The configuration of a wireless power transmission device S2, which is a modification of the wireless power transmission device S1 according to the first embodiment of the present invention, will now be descried with reference to FIG. 5. FIG. 5 is a circuit diagram illustrating an exemplary configuration of the wireless power transmission device S2 according to the modification of the first embodiment of the present invention with the load.

Referring to FIG. 5, the wireless power transmission device S2 includes the wireless power feeding device 100 and the wireless power receiving device 200. The wireless power feeding device 100 includes the power source 110, the power conversion circuit 120, and the power feeding unit 130. The wireless power receiving device 200 includes the power receiving unit 210, a rectifier unit 320, the power-receiving-side detecting means 230, switching means 340, and a control unit 350. The configurations of the power source 110, the power conversion circuit 120, the power feeding unit 130, the power receiving unit 210, and the power-receiving-side detecting means 230 are the same as those in the wireless power transmission device S1 according to the first embodiment. This modification differs from the first embodiment in that the wireless power transmission device S2 includes the center-tapped rectifier unit 320, instead of the rectifier unit 220, which is the bridge-type circuit in which the four diodes D1 to D4 are full-bridge connected to each other, in the wireless power transmission device S1 according to the first embodiment, and in that the wireless power transmission device S2 includes the switching means 340 and the control unit 350, instead of the switching means 240 and the control unit 250 in the wireless power transmission device S1 according to the first embodiment. The following description focuses on the points in which the modification differs from the first embodiment.

The rectifier unit 320 includes a center-tapped rectifier circuit 321 composed of two diodes D5 and D6 and the smoothing capacitor C30 connected in parallel to the center-tapped rectifier circuit 321. More specifically, the diode D5 is connected in series to one end of the power receiving coil L2 and the diode D6 is connected in series to the other end of the power receiving coil L2. Accordingly, the alternating current flowing through the rectifier unit 320 flows along two current paths: one current path that originates from the one end of the power receiving coil L2 and returns to a midpoint of the power receiving coil L2 through the diode D5, the smoothing capacitor C30, and the load RL and the other current path that originates from the other end of the power receiving coil L2 and returns to the midpoint of the power receiving coil L2 through the diode D6, the smoothing capacitor C30, and the load RL.

The switching means 340 has a function to short-circuit one of the two current paths through the rectifier unit 320. In this modification, the switching means 340 is composed of a switching element SW6, such as a field effect transistor (FET), and is connected in parallel to the diode D6 in the rectifier unit 320. More specifically, a collector terminal of the switching element SW6 is connected to a cathode of the diode D6 and an emitter terminal of the switching element SW6 is connected to an anode of the diode D6. In other words, the switching means 340 is connected in parallel only to the diode D6, among the two diodes D5 and D6 in the center-tapped rectifier circuit 321 in the rectifier unit 320. The switching element SW6 has a function to be turned on or off in response to the drive signal SG7 supplied from the control unit 350 described below. Although the configuration in which the switching element SW6 is connected in parallel to the diode D6 is adopted in this modification, the modification is not limited to this configuration. A configuration in which the switching element SW6 is connected in parallel to the diode D5 may be adopted.

The control unit 350 controls the operation of the switching means 340. Specifically, upon reception of the output signal SG5 from the output voltage detecting means 231, the control unit 350 performs control so that the drive signal SG7 is supplied to the switching element SW6 to turn on the switching element SW6 when the current flows through one of the current paths through the rectifier unit 320 and the control unit 350 performs control so that the supply of the drive signal SG7 to the switching element SW6 is stopped to turn off the switching element SW6 when the current flows through the other current path through the rectifier unit 320. Upon reception of the output signal SG6 from the output current detecting means 232, the control unit 350 performs control so that the drive signal SG7 is supplied to the switching element SW6 to turn on the switching element SW6 when the current flows through one of the current paths through the rectifier unit 320 and the control unit 350 performs control so that the supply of the drive signal SG7 to the switching element SW6 is stopped to turn off the switching element SW6 when the current flows through the other current path through the rectifier unit 320.

Also in this modification, the output signal SG5 is supplied to the control unit 350 if the output voltage value detected by the output voltage detecting means 231 exceeds the predetermined reference voltage value or the output signal SG6 is supplied to the control unit 350 if the output current value detected by the output current detecting means 232 exceeds the predetermined reference current value. The control is performed so that the drive signal SG7 is supplied to the switching element SW6 to turn on the switching element SW6 when the current flows through one of the current paths through the rectifier unit 320, and the control is performed so that the supply of the drive signal SG7 to the switching element SW6 is stopped to turn off the switching element SW6 when the current flows through the other current path through the rectifier unit 320. Among the current paths of the alternating current flowing through the rectifier unit 320, one of the current paths originates from one end of the power receiving coil L2 and returns to the other end of the power receiving coil L2 through the diode D5 and the switching element SW6 not through the smoothing capacitor C30 and the load RL because the diode D6 is short-circuited, and the other current path originates from the other end of the power receiving coil L2 and returns to the midpoint of the power receiving coil L2 through the diode D6, the smoothing capacitor C30, and the load RL. Accordingly, the current flowing along one of the current paths through the rectifier unit 320 is increased and the current flowing along the other current path through the rectifier unit 220 is decreased. In other words, the current supplied from the rectifier unit 320 to the load RL is also decreased. The voltage applied to the load RL is also decreased with the decreasing current from the rectifier unit 320 to the load RL. Accordingly, excessive voltage or excessive current that flows through a circuit element, such as the load RL, is suppressed upon occurrence of any abnormality, such as the overvoltage or the overcurrent.

Second Embodiment

Figure 6:
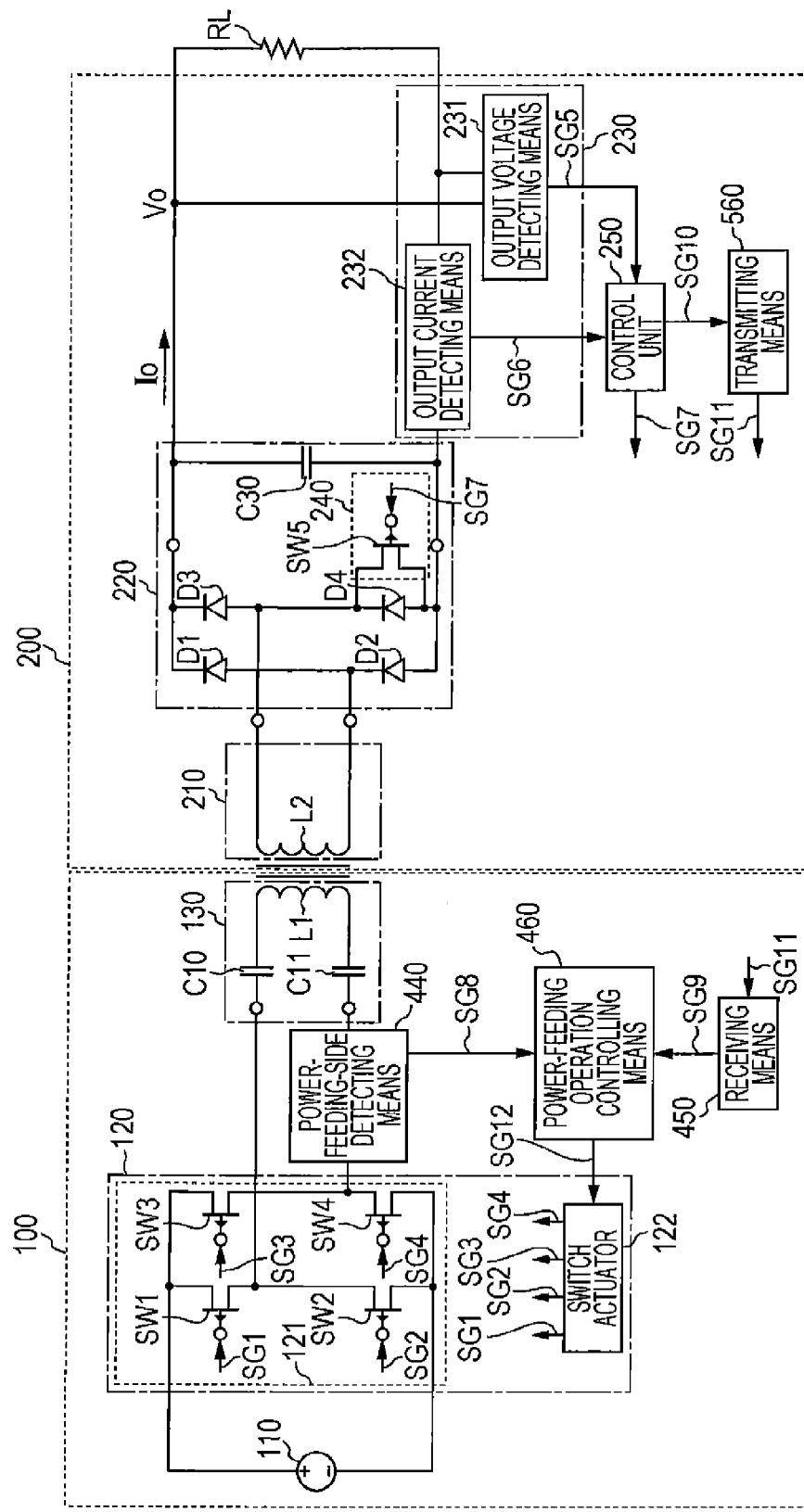
FIG. 6 is a circuit diagram illustrating an exemplary configuration of a wireless power transmission device according to a second embodiment of the present invention with the load.

The configuration of a wireless power transmission device S3 according to a second embodiment of the present invention will now be descried with reference to FIG. 6. FIG. 6 is a circuit diagram illustrating an exemplary configuration of the wireless power transmission device S3 according to the second embodiment of the present invention with the load.

Referring to FIG. 6, the wireless power transmission device S3 includes the wireless power feeding device 100 and the wireless power receiving device 200, as in the wireless power transmission device S1 according to the first embodiment. The wireless power feeding device 100 includes the power source 110, the power conversion circuit 120, the power feeding unit 130, power-feeding-side detecting means 440, receiving means 450, and power-feeding operation controlling means 460, as illustrated in FIG. 6. The configurations of the power source 110, the power conversion circuit 120, and the power feeding unit 130 are the same as those in the wireless power transmission device S1 according to the first embodiment. However, the wireless power transmission device S3 according to the second embodiment differs from the wireless power transmission device S1 according to the first embodiment in that the wireless power feeding device 100 includes the power-feeding-side detecting means 440, the receiving means 450, and the power-feeding operation controlling means 460. The following description focuses on the points in which the second embodiment differs from the first embodiment.

The power-feeding-side detecting means 440 detects the output current value from the power conversion circuit 120. The power-feeding-side detecting means 440 compares a predetermined reference current value with the detected output current value. If the detected output current value exceeds the reference current value, the power-feeding-side detecting means 440 supplies an output signal SG8 to the power-feeding operation controlling means 460 described below. For example, a current sensor or a current transformer may be used as the power-feeding-side detecting means 440.

The receiving means 450 supplies an output signal SG9 to the power-feeding operation controlling means 460 described below upon reception of an output signal SG11 from transmitting means 560 described below. For example, infrared-ray communication or radio communication may be used as the receiving means 450.

The power-feeding operation controlling means 460 has a function to control a power feeding operation of the wireless power feeding device 100. Specifically, upon reception of the output signal SG8 from the power-feeding-side detecting means 440, the power-feeding operation controlling means 460 performs an intermittent control action in which start and stop of the power feeding operation of the wireless power feeding device 100 are repeated. In the intermittent control action, the power-feeding operation controlling means 460 performs control so that an output signal SG12 is supplied to the switch actuator 122 to cause the switch actuator 122 to temporarily turn off the switching elements SW1 to SW4. As a result, the intermittent control action is performed in which start and stop of the power feeding operation are repeated without completely stopping the power feeding operation of the wireless power feeding device 100.

In the wireless power transmission device S3 according to the second embodiment, the wireless power feeding device 100 itself detect an occurrence of the overcurrent to restrict the power feeding operation. Here, the wireless power feeding device 100 is capable of detecting, for example, an abnormality caused by positional shift between the power feeding coil L1 and the power receiving coil L2 or the like and an abnormality caused by breakage or disconnection of a circuit element composing the wireless power feeding device 100 or the wireless power receiving device 200. In the case of the abnormality caused by the positional shift between the power feeding coil L1 and the power receiving coil L2 or the like, the wireless power feeding device 100 may return to a normal state if the positional shift between the power feeding coil L1 and the power receiving coil L2 is corrected. However, if the power feeding operation of the wireless power feeding device 100 is immediately stopped upon detection of an occurrence of any abnormality in the wireless power feeding device 100, it undesirably takes a long time to restart the power feeding operation of the wireless power feeding device 100 even when the positional shift between the power feeding coil L1 and the power receiving coil L2 is corrected and the wireless power feeding device 100 returns to the normal state. In contrast, in the wireless power transmission device S3 according to the second embodiment, since the intermittent control action in which start and stop of the power feeding operation are repeated is performed without completely stopping the power feeding operation of the wireless power feeding device 100 even if the wireless power feeding device 100 itself detects any abnormality, it is possible to rapidly restart the power feeding operation of the wireless power feeding device 100 when the abnormality caused by the positional shift between the power feeding coil L1 and the power receiving coil L2 has occurred in the wireless power feeding device 100, the positional shift between the power feeding coil L1 and the power receiving coil L2 is subsequently corrected, and the wireless power feeding device 100 returns to the normal state. The intermittent control action of the wireless power feeding device 100 is an operation not to completely stop the power feeding operation of the wireless power feeding device 100 and the power transmission in the normal power feeding operation is not performed during the intermittent control action.

Upon reception of the output signal SG8 from the power-feeding-side detecting means 440 and reception of the output signal SG9 from the receiving means 450, the power-feeding operation controlling means 460 stops the wireless power feeding device 100. Here, the power-feeding operation controlling means 460 performs the control so that the output signal SG12 is supplied to the switch actuator 122 to cause the switch actuator 122 to completely turn off the switching elements SW1 to SW4. As a result, the power feeding operation of the wireless power feeding device 100 is completely stopped. Although the configuration in which the power-feeding operation controlling means 460 is separated from the switch actuator 122 is adopted, the power-feeding operation controlling means 460 may be integrated with the switch actuator 122.

In the wireless power transmission device S3 according to the second embodiment, the power feeding operation of the wireless power feeding device 100 is stopped upon detection of any abnormality at the power receiving side, in addition to any abnormality at the power feeding side. Here, the abnormality capable of being detected by the wireless power receiving device 200 is the breakage or the disconnection of a circuit element in the wireless power receiving device 200. Upon occurrence of such an abnormality, it is necessary to immediately stop the power feeding operation of the wireless power feeding device 100 to correct the abnormality in order to return the wireless power feeding device 100 to the normal state. In other words, the abnormality detected by the wireless power feeding device 100 may be corrected to cause the wireless power feeding device 100 to return to the normal state depending on a power transmission condition (the positional relationship between the power feeding coil L1 and the power receiving coil L2), as described above, while the abnormality detected by the wireless power receiving device 200 is difficult to be corrected to cause the wireless power feeding device 100 to return to the normal state in a state in which the wireless power transmission device S3 is activated with the abnormality. In the wireless power transmission device S3 according to the second embodiment, since the power feeding operation of the wireless power feeding device 100 is stopped upon detection of any abnormality at the power receiving side, in addition to any abnormality at the power feeding side, it is possible to rapidly stop the power feeding operation of the wireless power feeding device 100 if the power feeding operation of the wireless power feeding device 100 is required to be stopped while preventing the problem caused by the stop of the power feeding operation of the wireless power feeding device 100 when the abnormality at the power feeding side is not caused by the abnormality at the power receiving side.

The wireless power receiving device 200 includes the power receiving unit 210, the rectifier unit 220, the power-receiving-side detecting means 230, the switching means 240, the control unit 250, and the transmitting means 560, as illustrated in FIG. 6. The power receiving unit 210, the rectifier unit 220, the power-receiving-side detecting means 230, and the switching means 240 are the same as those in the wireless power transmission device S1 according to the first embodiment. However, the wireless power transmission device S3 according to the second embodiment differs from the wireless power transmission device S1 according to the first embodiment in that the wireless power receiving device 200 includes the transmitting means 560 and in the operation of the control unit 250. The following description focuses on the points in which the second embodiment differs from the first embodiment.

The control unit 250 controls the operation of the switching means 240. Specifically, upon reception of the output signal SG5 from the output voltage detecting means 231, the control unit 250 performs the control so that the drive signal SG7 is supplied to the switching element SW5 to turn on the switching element SW5. Upon reception of the output signal SG6 from the output current detecting means 232, the control unit 250 performs the control so that the drive signal SG7 is supplied to the switching element SW5 to turn on the switching element SW5. In the second embodiment, in addition to the above operations, upon reception of the output signal SG5 from the output voltage detecting means 231, the control unit 250 supplies an output signal SG10 to the transmitting means 560 described below. Similarly, upon reception of the output signal output signal SG6 from the output current detecting means 232, the control unit 250 supplies the output signal SG10 to the transmitting means 560 described below.

Upon reception of the output signal SG10 from the control unit 250, the transmitting means 560 transmits the output signal SG11 indicating the abnormal state of the wireless power receiving device 200 to the receiving means 450 in the wireless power feeding device 100. For example, infrared-ray communication or radio communication may be used as the transmitting means 560. Although the configuration in which the control unit 250 is separated from the transmitting means 560 is adopted, the control unit 250 may be integrated with the transmitting means 560. For example, when the function of the transmitting means 560 is added to the control unit 250, the control unit 250 directly supplies the output signal SG11 indicating the abnormal state of the wireless power receiving device 200 to the receiving means 450 upon reception of the output signal SG5 from the output voltage detecting means 231 or the output signal SG6 from the output current detecting means 232.

As described above, in the wireless power transmission device S3 according to the second embodiment, the power-feeding operation controlling means 460 performs the intermittent control action in which start and stop of the power feeding operation of the wireless power feeding device 100 are repeated if the value detected by the power-feeding-side detecting means 440 exceeds the predetermined reference value. Accordingly, it is possible to prevent the breakage of a circuit element, such as the power conversion circuit 120, even if any abnormality occurs at the power receiving side and the overcurrent flows at the power feeding side. In addition, since the wireless power feeding device 100 itself detects an occurrence of the overcurrent to restrict the power feeding operation in the wireless power transmission device S3 according to the second embodiment, it is possible to minimize the time delay from the occurrence of any abnormality at the power receiving side to the start of the restriction of the power feeding operation.

In addition, the wireless power transmission device S3 according to the second embodiment includes the transmitting means 560, which transmits the output signal SG10 indicating the abnormal state to the wireless power feeding device 100 if the value detected by the power-receiving-side detecting means 230 in the wireless power receiving device 200 exceeds the predetermined reference value. The power-feeding operation controlling means 460 stops the power feeding operation of the wireless power feeding device 100 if the value detected by the power-feeding-side detecting means 440 exceeds the predetermined reference value and the output signal SG11 indicating the abnormal state is received from the transmitting means 560 in the wireless power receiving device 200. Accordingly, since the power feeding operation of the wireless power feeding device 100 is stopped upon detection of any abnormality at the power receiving side, in addition to any abnormality at the power feeding side, it is possible to prevent any problem caused by the stop of the power feeding operation from occurring when the abnormality at the power feeding side is not affected by the abnormality at the power receiving side. As a result, it is possible to improve the reliability as the wireless power transmission device S3.

Third Embodiment

Figure 7:
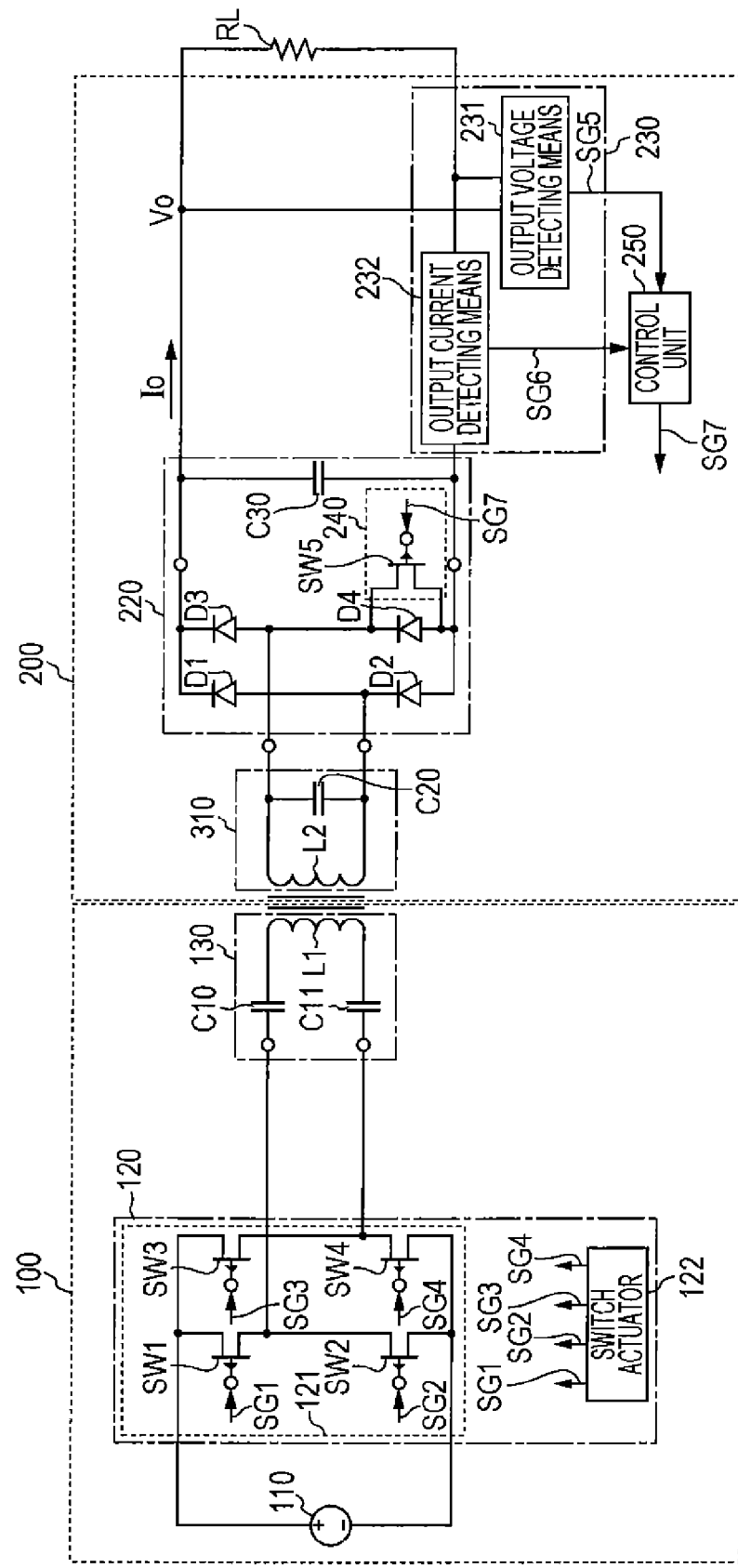
FIG. 7 is a circuit diagram illustrating an exemplary configuration of a wireless power transmission device according to a third embodiment of the present invention with the load.

The configuration of a wireless power transmission device S4 according to a third embodiment of the present invention will now be descried with reference to FIG. 7. FIG. 7 is a circuit diagram illustrating an exemplary configuration of the wireless power transmission device S4 according to the third embodiment of the present invention with the load.

Referring to FIG. 7, the wireless power transmission device S4 includes the wireless power feeding device 100 and the wireless power receiving device 200, as in the wireless power transmission device S1 according to the first embodiment. The wireless power feeding device 100 includes the power source 110, the power conversion circuit 120, and the power feeding unit 130, as illustrated in FIG. 7. The wireless power receiving device 200 includes a power receiving unit 310, the rectifier unit 220, the power-receiving-side detecting means 230, the switching means 240, and the control unit 250, as illustrated in FIG. 7. The configurations of the power source 110, the power conversion circuit 120, the power feeding unit 130, the rectifier unit 220, the power-receiving-side detecting means 230, the switching means 240, and the control unit 250 are the same as those in the wireless power transmission device S1 according to the first embodiment. However, the third embodiment differs from the first embodiment in that the wireless power transmission device S4 includes the power receiving unit 310, instead of the power receiving unit 210 in the wireless power transmission device S1 according to the first embodiment. The following description focuses on the points in which the third embodiment differs from the first embodiment.

The power receiving unit 310 includes the power receiving coil L2 and a power-receiving-side resonant capacitor C20. The power receiving coil L2 is formed using a Litz wire formed of multiple fine conductor strands or a single line. For example, a planar coil or a solenoid coil may be used as the power receiving coil L2. In the third embodiment, the power-receiving-side resonant capacitor C20 is connected in parallel to the power receiving coil L2. Accordingly, the power receiving coil L2 composes a power-receiving-side LC rectifier circuit with the power-receiving-side resonant capacitor C20. When the wireless power transmission device S4 according to the third embodiment is used in equipment to supply power to a vehicle, such as an electric vehicle, the power receiving unit 310 is mounted under the vehicle.

Also in the third embodiment, the output signal SG5 is supplied from the output voltage detecting means 231 to the control unit 250 if the output voltage value detected by the output voltage detecting means 231 exceeds the predetermined reference voltage value or the output signal SG6 is supplied from the output current detecting means 232 to the control unit 250 if the output current value detected by the output current detecting means 232 exceeds the predetermined reference current value. The control unit 250 performs the control so that the drive signal SG7 is supplied to the switching element SW5 to turn on the switching element SW5. Accordingly, one of the current paths of the alternating current flowing through the rectifier unit 220 originates from the power receiving coil L2 and returns to the power receiving coil L2 through the switching element SW5 and the diode D2 because the diode D4 is short-circuited. Since the power-receiving-side resonant capacitor C20 is connected in parallel to the power receiving coil L2 and the current path through the rectifier unit 220 is not directly affected by the power-receiving-side resonant capacitor C20, the current flowing along one of the current paths through the rectifier unit 220 is increased and the current flowing along the other current path through the rectifier unit 220 is decreased. In other words, the current supplied from the rectifier unit 220 to the load RL is also decreased. The voltage applied to the load RL is also decreased with the decreasing current from the rectifier unit 220 to the load RL. Accordingly, excessive voltage or excessive current that flows through a circuit element, such as the load RL, is suppressed upon occurrence of any abnormality, such as the overvoltage or the overcurrent.

As described above, the wireless power transmission device S4 according to the third embodiment includes the switching means 240, which short-circuits one of the two current paths through the rectifier unit 220 if the value detected by the power-receiving-side detecting means 230 exceeds the predetermined reference value. Accordingly, the current flowing along one of the current paths through the rectifier unit 220 is increased and the current flowing along the other current path through the rectifier unit 220 is decreased. In other words, the current supplied from the rectifier unit 220 to the load RL is also decreased. The voltage applied to the load RL is also decreased with the decreasing current from the rectifier unit 220 to the load RL. Accordingly, excessive voltage or excessive current that flows through a circuit element, such as the load RL, is suppressed upon occurrence of any abnormality, such as the overvoltage or the overcurrent. As a result, it is possible to prevent the breakage of the circuit element upon occurrence of any abnormality, such as the overvoltage or the overcurrent. In addition, since the protection circuit that operates upon occurrence of any abnormality is composed of the switching means 240, which short-circuits one of the two current paths through the rectifier unit 220, it is possible to reduce the size of the device and simplify the device.

While the invention is described in terms of some specific examples and embodiments, it will be clear that this invention is not limited to these specific examples and embodiments and that many changes and modified embodiments will be obvious to those skilled in the art without departing from the true spirit and scope of the invention. Accordingly, the description and the drawings in the specification should be interpreted not limitedly but demonstratively.

For example, although the power feeding coil L1 composes the LC resonant circuit with the power-feeding-side resonant capacitors C10 and C11 in the first embodiment, the first embodiment is not limited to this configuration. The first embodiment is applicable to a configuration using electromagnetic induction with which the power feeding coil L1 is magnetically coupled (inductively coupled) to the power receiving coil L2.

What is claimed is:

1. A wireless power receiving device that wirelessly receives power, the wireless power receiving device comprising:
    a power receiving unit that includes a power receiving coil;
    a rectifier unit that performs full-wave rectification of the power received by the power receiving coil and supplies the power to a load, the rectifier unit including two current paths there-through;
    power-receiving-side detecting means that detects an output voltage value or an output current value from the rectifier unit; and
    switching means that short-circuits, in the rectifier unit, only one of the two current paths through the rectifier unit if the value detected by the power-receiving-side detecting means exceeds a predetermined reference value.

2. The wireless power receiving device according to claim 1,
    wherein the rectifier unit includes a bridge circuit in which four diodes are bridge-connected to each other and a smoothing capacitor connected in parallel to the bridge circuit, and
    wherein the switching means is composed of a switching element connected in parallel to one diode, among the four diodes in the bridge circuit.

3. The wireless power receiving device according to claim 2,
    wherein no capacitor connected in series or in parallel to the power receiving coil is provided within the power receiving unit.

4. A wireless power transmission device comprising:
    the wireless power receiving device according to claim 3, and
    a wireless power feeding device,
    wherein the wireless power feeding device includes
        a power feeding coil;
        a power conversion circuit that converts direct current power that is input to alternating current power and supplies the alternating current power to the power feeding coil;
        power-feeding-side detecting means that detects an output current value from the power conversion circuit; and
        power-feeding operation controlling means that controls a power feeding operation of the wireless power feeding device, and
    wherein, if the value detected by the power-feeding-side detecting means exceeds a predetermined reference value, the power-feeding operation controlling means performs an intermittent control action in which start and stop of the power feeding operation of the wireless power feeding device are repeated.

5. The wireless power transmission device according to claim 4,
    wherein the wireless power receiving device further includes transmitting means that transmits a signal indicating an abnormal state to the wireless power feeding device if the value detected by the power-receiving-side detecting means exceeds the predetermined reference value, and
    wherein, if the value detected by the power-feeding-side detecting means exceeds the predetermined reference value and the signal indicating the abnormal state is received from the transmitting means, the power-feeding operation controlling means stops the power feeding operation of the wireless power feeding device.

6. A wireless power transmission device comprising:
    the wireless power receiving device according to claim 2, and
    a wireless power feeding device,
    wherein the wireless power feeding device includes
        a power feeding coil;
        a power conversion circuit that converts direct current power that is input to alternating current power and supplies the alternating current power to the power feeding coil;
        power-feeding-side detecting means that detects an output current value from the power conversion circuit; and
        power-feeding operation controlling means that controls a power feeding operation of the wireless power feeding device, and
    wherein, if the value detected by the power-feeding-side detecting means exceeds a predetermined reference value, the power-feeding operation controlling means performs an intermittent control action in which start and stop of the power feeding operation of the wireless power feeding device are repeated.

7. The wireless power transmission device according to claim 6,
    wherein the wireless power receiving device further includes transmitting means that transmits a signal indicating an abnormal state to the wireless power feeding device if the value detected by the power-receiving-side detecting means exceeds the predetermined reference value, and
    wherein, if the value detected by the power-feeding-side detecting means exceeds the predetermined reference value and the signal indicating the abnormal state is received from the transmitting means, the power-feeding operation controlling means stops the power feeding operation of the wireless power feeding device.

8. The wireless power receiving device according to claim 1,
    wherein no capacitor connected in series or in parallel to the power receiving coil is provided within the power receiving unit.

9. A wireless power transmission device comprising:
    the wireless power receiving device according to claim 8, and
    a wireless power feeding device,
    wherein the wireless power feeding device includes
        a power feeding coil;
        a power conversion circuit that converts direct current power that is input to alternating current power and supplies the alternating current power to the power feeding coil;
        power-feeding-side detecting means that detects an output current value from the power conversion circuit; and
        power-feeding operation controlling means that controls a power feeding operation of the wireless power feeding device, and
    wherein, if the value detected by the power-feeding-side detecting means exceeds a predetermined reference value, the power-feeding operation controlling means performs an intermittent control action in which start and stop of the power feeding operation of the wireless power feeding device are repeated.

10. The wireless power transmission device according to claim 9,
wherein the wireless power receiving device further includes transmitting means that transmits a signal indicating an abnormal state to the wireless power feeding device if the value detected by the power-receiving-side detecting means exceeds the predetermined reference value, and
wherein, if the value detected by the power-feeding-side detecting means exceeds the predetermined reference value and the signal indicating the abnormal state is received from the transmitting means, the power-feeding operation controlling means stops the power feeding operation of the wireless power feeding device.

11. A wireless power transmission device comprising:
the wireless power receiving device according to claim 1, and
a wireless power feeding device,
wherein the wireless power feeding device includes
a power feeding coil;
a power conversion circuit that converts direct current power that is input to alternating current power and supplies the alternating current power to the power feeding coil;
power-feeding-side detecting means that detects an output current value from the power conversion circuit; and
power-feeding operation controlling means that controls a power feeding operation of the wireless power feeding device, and
wherein, if the value detected by the power-feeding-side detecting means exceeds a predetermined reference value, the power-feeding operation controlling means performs an intermittent control action in which start and stop of the power feeding operation of the wireless power feeding device are repeated.

12. The wireless power transmission device according to claim 11,
wherein the wireless power receiving device further includes transmitting means that transmits a signal indicating an abnormal state to the wireless power feeding device if the value detected by the power-receiving-side detecting means exceeds the predetermined reference value, and
wherein, if the value detected by the power-feeding-side detecting means exceeds the predetermined reference value and the signal indicating the abnormal state is received from the transmitting means, the power-feeding operation controlling means stops the power feeding operation of the wireless power feeding device.

13. The wireless power receiving device according to claim 1, wherein
the rectifier unit has four diodes including a first diode, a second diode, a third diode, and a fourth diode, with the first diode and the fourth diode included in a first current path of the two current paths and the second diode and the third diode included in a second current path of the two current paths, and
the switching means only short-circuits the fourth diode when the value detected by the power-receiving side detecting means exceeds the predetermined reference value.

* * * * *